UNITED STATES PATENT OFFICE.

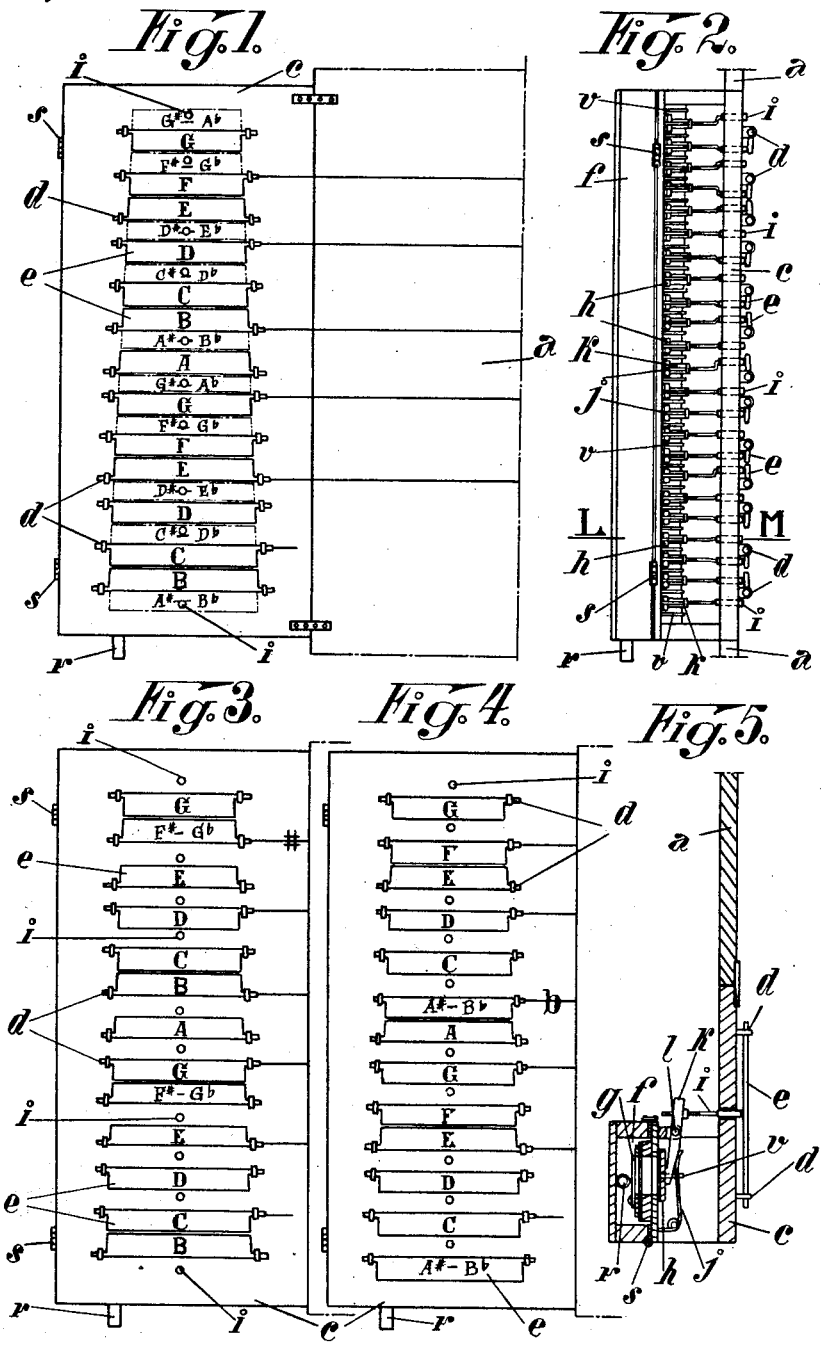

JULIUS WOITINEK, OF POSEN, GERMANY.

CHART FOR TEACHING MUSIC.

1,058,831.  Specification of Letters Patent.  Patented Apr. 15, 1913.

Application filed October 29, 1909.  Serial No. 525,409.

*To all whom it may concern:*

Be it known that I, JULIUS WOITINEK, a subject of the Emperor of Germany, residing at 18 Gartenstrasse, Posen, Germany, have invented certain new and useful Improvements in Charts for Teaching Music, of which the following is a specification.

This invention for improvements in apparatus for teaching music has for its object an improved device by which the elements of music can be more effectively and quickly taught than heretofore.

Now, according to my invention, keys marked with the names of the notes are arranged on a base board set up by the side of a black-board or the like marked with the five lines of the staff, in such a way that the keys are opposite their corresponding lines or spaces in the staff. Each key is pivoted along one of its horizontal edges so that it can be turned over, and is marked on the back with the same note flatted or sharped. Underneath each key in each of its positions is a push rod connected to a valve in a wind chest provided with reeds, in such a way that when a key is depressed the note marked on it is sounded. By this means any scale can be sounded by simply turning over the key note or notes to give these notes flatted or sharped; and as these flatted or sharped notes are still opposite their lines or spaces in the staff, being only raised or lowered slightly, confusion in the pupils' minds is effectually prevented.

Reference to the accompanying drawings:—Figure 1 is a front elevation of the device, all the notes not belonging to the scale of C major being in smaller type. Fig. 2 is a side elevation. Fig. 3 is a front elevation showing the change from the scale of C major to the scale of G major by raising the F key to the position of F sharp. Fig. 4 shows the change of the scale of C major to the scale of F major by lowering the B key to the position of B flat, and Fig. 5 is a section on the line L M in Fig. 2.

The blackboard *a* has the five lines of the staff marked on it as shown. The keys *e* are pivoted about one edge, on a support *c*, as shown with their pivots *d* in line with the corresponding lines and spaces on the board *a*. There is as shown a push rod *i* beneath each key in each position.

In Fig. 3 the F keys are turned upward over the F♯ push rods, showing the F♯ signs on their reverse sides. Any cords or melodies played on the keys now will be in the key of G major, but the keys will still be opposite their representation in the staff. In Fig. 4 is shown in the same way the turning down of the B keys to the position of B flat to form the scale of F major, and it will be readily understood that any other scale can be formed in the same way by folding over the necessary keys corresponding to the key-signature of the required scale.

When a key is depressed, the push rod *i* presses down the lever *k* against the action of a spring *j*, thus opening one of the valves *h* which are guided by guides *v* and causing the reed *g* in the wind-chest *f* to sound.

The wind chest is hinged at *s* and has an air inlet *r* which may be connected to a foot bellows or other source of compressed air.

Having thus described my invention what I claim is:

1. An apparatus for teaching music comprising a series of keys each key being marked with the note which it sounds and pivoted about one horizontal edge and marked on the reverse side with the flat or sharp of the note marked on its other side, and means actuated by the key for sounding the natural, or the flat or sharp according as the key is in its normal or reversed position.

2. An apparatus for teaching music comprising a series of reversible keys having suitable scale marks thereon, and a wind chest with reeds and valves, push rods for operating the valves, one push rod being arranged underneath each key in either of its positions, the connection being such that when a key is depressed the reed represented by the note on the outward side of the key is sounded.

3. An apparatus for teaching music comprising a series of reversible keys and means for sounding a different note in each position of the key.

In testimony whereof I have affixed my signature, in presence of two witnesses.

JULIUS WOITINEK.

Witnesses:
PAUL KURZS,
ERNST GERLACH.